United States Patent
Goujard et al.

(12)

(10) Patent No.: US 6,291,058 B1
(45) Date of Patent: Sep. 18, 2001

(54) COMPOSITE MATERIAL WITH CERAMIC MATRIX AND SIC FIBER REINFORCEMENT, METHOD FOR MAKING SAME

(75) Inventors: Stéphane Goujard, Merignac; Alain Caillaud, Saint Caprais de Bordeaux; Sébastien Bertrand, Cours de Pile; René Pailler, Cestas; Jean-Luc Charvet, Cabanac, all of (FR)

(73) Assignee: Societe Nationale d'Etude et de Construction de Moteurs d'Aviation S.N.E.C.M.A., Paris (FR)

( * ) Notice: Subject to any disclaimer, the term of this patent is extended or adjusted under 35 U.S.C. 154(b) by 0 days.

(21) Appl. No.: 09/308,960
(22) PCT Filed: Nov. 28, 1997
(86) PCT No.: PCT/FR97/02148
§ 371 Date: May 27, 1999
§ 102(e) Date: May 27, 1999
(87) PCT Pub. No.: WO98/23555
PCT Pub. Date: Jun. 4, 1998

(30) Foreign Application Priority Data

Nov. 28, 1996 (FR) .................................................. 96 14604

(51) Int. Cl.$^7$ ..................................................... B32B 17/12
(52) U.S. Cl. .................................... 428/293.4; 428/293.7; 428/294.1
(58) Field of Search ............................... 428/293.4, 293.7, 428/294.1

(56) References Cited

U.S. PATENT DOCUMENTS 5,071,679   12/1991   Heraud et al. .
5,246,736    9/1993   Goujard et al. .

FOREIGN PATENT DOCUMENTS

WO 95/09136   4/1996   (WO) .
WO 96/13472   5/1996   (WO) .

OTHER PUBLICATIONS

Akira Kamiya et al "Mechanical Properties of Unidirectional Hi–Nicalon Fiber–reinforced S13N4 Matrix Composites" *Journal of the Ceramic Society of Japan, International Edition*, vol. 102, No. 10, Oct. 1, 1994, pp. 959–962.

*Primary Examiner*—Edward J. Cain
(74) *Attorney, Agent, or Firm*—Weingarten, Schurgin, Gagnebin & Hayes LLP

(57) ABSTRACT

The material comprises fiber reinforcement made of fibers that are essentially constituted by silicon carbide, and an interphase layer between the fibers of the reinforcement and the matrix. The reinforcing fibers are long fibers containing less than 5% atomic residual oxygen and they have a modulus greater than 250 GPa, and the interphase layer is strongly bonded to the fibers and to the matrix such that the shear breaking strengths within the interphase layer and at the fiber-interphase bonds and at the interphase-matrix bonds are greater than the shear breaking strengths encountered within the matrix.

20 Claims, 1 Drawing Sheet

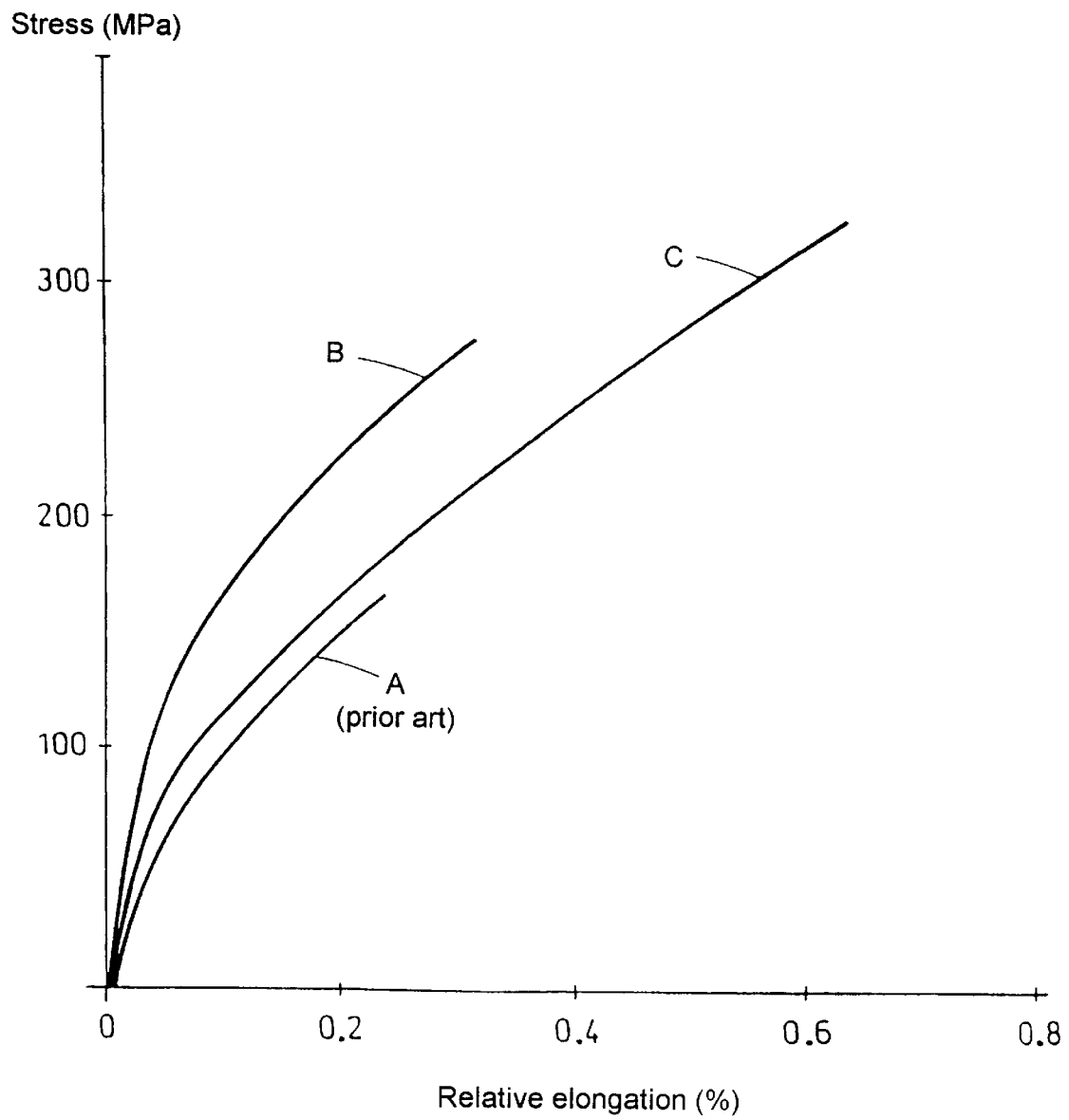

COMPOSITE MATERIAL WITH CERAMIC MATRIX AND SIC FIBER REINFORCEMENT, METHOD FOR MAKING SAME

The present invention relates to ceramic matrix composite materials, and more particularly to composite materials having fiber reinforcement made of fibers that are constituted essentially by silicon carbide (SiC), with an interphase layer between the reinforcing fibers and the ceramic matrix.

Ceramic matrix composite materials are used in various applications, for example in the fields of aviation and space, where they are used for their thermostructural properties, i.e. their suitability for making structural elements because of their mechanical strength, particularly in bending, in traction, and against shock, which is much better than that of solid ceramics, and because of their ability to conserve such mechanical properties up to high temperatures that may be as much as 1500° C. or more.

Making thermostructural composite materials with an interphase between the fibers and the matrix is known, in particular from documents U.S. Pat. Nos. 4,752,503 and 5,026,604. The interphase used is pyrolytic carbon (PyC) or boron nitride (BN) and its structure is anisotropic being of the lamellar or foliated type so as to encourage the deflection of cracks which appear in the ceramic matrix in order to avoid said cracks reaching the fibers and giving rise to premature destruction of the material by breaking the fibers of the fiber reinforcement.

In ceramic matrix composite materials, cracking of the matrix is practically inevitable, as from manufacture, because of the thermal expansion differences between the reinforcement and the matrix.

The use of a lamellar interphase, which establishes a relatively weak bond between the fibers and the matrix, thus has the advantage of lengthening the lifetime of the material by creating crack deflection zones in which crack-bottom stresses can dissipate by localized decohesion of the lamellar microstructure of the interphase.

Nevertheless, in conditions of use under an oxidizing atmosphere and at high temperature, crack propagation as far as the interphase opens access paths for oxygen. The PyC or BN interphase and even the underlying fiber then oxidizes, leading to a modification of the fiber-matrix bonds and, progressively, to the material being damaged and breaking.

Solutions have been proposed to prevent, or at least retard, oxygen access to the interphase between the fibers and the matrix, in particular by plugging the cracks which appear within the matrix or by slowing down crack propagation within the matrix.

Thus, it is well known to include within the matrix a compound that is capable of healing cracks by forming a glass. The compound is selected so that the glass is capable of plugging the cracks and preventing oxygen passing along them, by taking on a pasty state at the utilization temperatures of the composite material. By way of example, reference can be made to document U.S. Pat. No. 5,246,736 which describes making at least one phase of the matrix out of an Si—B—C ternary system capable of forming a glass, in particular of the borosilicate type, having self-healing properties, and also to document WO-A-96/30317 which describes the formation of a self-healing matrix.

In addition, document U.S. Pat. No. 5,079,639 describes a composite material having toughness improved by sequencing the matrix so that crack deflection zones are generated within the matrix, thereby preventing cracks from progressing directly as far as the interphase. methods using a self-healing phase are effective over a limited temperature range at which the self-healing property is present, whereas methods using a sequenced matrix retard crack propagation but do not prevent them from reaching the interphase.

Thus, an object of the present invention is to provide a fiber and ceramic matrix composite material essentially made of SiC that has improved properties by more effectively preventing cracks from reaching the interphase layer between the fibers and the matrix.

This object is achieved by the fact that the fibers of the reinforcement are long fibers containing less than 5% atomic residual oxygen and having a modulus greater than 250 GPa, and the interphase layer is strongly bonded to the fibers and to the matrix in such a manner that the shear breaking strengths within the interphase layer and at the fiber-interphase bonds and at the interphase-matrix bonds are greater than the shear breaking strengths encountered within the matrix.

Remarkable characteristics of the invention lie in the presence of an interphase capable of providing a strong bond with the fibers and the matrix, and in selecting fibers that are capable of preserving and withstanding such strong bonds with the interphase.

To term "strong" bond is used herein to mean that within the interphase layer and at the interfaces between the interphase and the fibers and between the interphase and the matrix there exist shear breaking strengths greater than those which are to be found within the matrix.

It has been found, in particular, that a strong bond can be obtained with an interphase layer and a material whose microstructure presents little anisotropy. A microstructure is said herein to present "little anisotropy" when it presents anisotropic domains of small size (preferably less than 15 nanometers) which are dispersed within a quasi-isotropic background and which are juxtaposed in random directions.

Examples of materials that can be suitable for the interphase layer are boron nitride and pyrolytic carbon which are formed by chemical vapor infiltration under operating conditions that give them a microstructure which presents little anisotropy.

As mentioned above, it is essential for the fibers used to be capable of preserving the strength of the bond with the interphase and of withstanding this strong bond.

That is why the fibers used are essentially SiC fibers containing little residual oxygen, typically less than 5% atomic, and preferably less than 1% atomic, so as to avoid polluting the composition and/or the microstructure of the interphase by significant migration therein of residual oxygen contained in the fibers.

In addition, in order to be capable of withstanding a strong bond with the matrix, and in particular in order to avoid bonds breaking due to expansion differences of thermal origin between the fibers and the interphase, the fibers used are long fibers which present radial expansion such that the interphase is preferably compressed between the fibers and the matrix.

Fibers are said to be "long" herein when their mean length is greater than 10 cm.

Essentially SiC fibers satisfying these requirements are in particular the fibers sold under the name "Hi-Nicalon" by the Japanese company Nippon Carbon. The use of such fibers for forming unidirectional composites with a silicon nitride $Si_3N_4$ matrix is described in an article by A. Kamiya et al., published in "Journal of the Ceramic Society of Japan, International Edition", Vol. 102, No. 10, October 1994, under the title "Mechanical properties of unidirectional HI-NICALON fiber reinforced $Si_3N_4$ matrix, composites". The $Si_3N_4$ matrix is obtained by impregnation by means of a composition containing a precursor organic resin and $Si_3N_4$ powder, and then hot pressing. However, the author states that a strong bond is then obtained between the fibers and the matrix in the absence of an interphase, and that the strong bond can be avoided by using fibers that are coated in carbon. In contrast, in the material of the invention, the interphase is selected so as to ensure strong bonding between the fibers and the matrix.

Preferably, when making a composite material of the invention, the fibers can be subjected to pretreatment so as to favor long duration of the strong bond with the interphase layer.

Such pretreatment is, for example, of chemical nature and consists in immersing the fiber fabric that is to form the reinforcement, or indeed the already prepared reinforcement, in a bath of acid so as to eliminate the silica that may be present on the fibers. Such treatment is known and described in document U.S. Pat. No. 5,071,679.

Another pretreatment that can be performed on the fibers is heat treatment for the purpose of stabilizing the fiber dimensionally so as to avoid possible breaking of bonds by excessive differential thermal expansion between the fibers and the interphase layer. This heat pretreatment is more particularly desirable when the interphase layer is made of pyrolytic carbon that presents greater anisotropy, i.e. having anisotropic domains of dimension that may exceed 15 nanometers. It is preferably performed at a temperature greater than 1250° C., e.g. approximately equal to 1300° C., under an inert atmosphere, such as an atmosphere of pure argon.

Particular implementations of the invention are described below. Reference is made to the accompanying drawing, in which:

the sole figure is a graph with curves showing the relationship between stress and deformation during tensile tests on test pieces made out of material of the invention and out of a prior art material.

To make a piece of ceramic matrix composite material of the invention, a preform is made initially that constitutes the fiber reinforcement of the composite material.

By way of example, the preform is prepared from a fabric based on essentially SiC fibers possessing the required properties, i.e.

long fibers having a mean length greater than 10 cm, and preferably greater than 20 cm;

fibers having a modulus greater than 250 GPa, and preferably greater than 270 GPa; and fibers containing less than 5% atomic and preferably less than 1% atomic residual oxygen.

The base fabric can be a thread, a cable, a braid, a woven fabric, a unidirectional sheet of threads or cables, or a complex made up of a plurality of unidirectional sheets superposed with different directions.

When thermal pretreatment is to be performed on the fibers, it is preferably performed on the base fabric prior to preparing the preform. When chemical pretreatment of the surface of the fibers is to be performed by immersion in a bath of acid, it can be performed on the base fabric prior to preparing the preform, or on the preform after it has been prepared.

Depending on the shape of the piece of composite material to be made, the preform is prepared by stacking a plurality of plies of base fabric while flat, or by draping a plurality of plies of base fabric on a former, or by placing plies of base fabric in tooling enabling the desired shape to be given to the preform, or indeed by winding to produce turns that are superposed or not superposed.

The interphase layer is deposited on the fibers within the preform by chemical vapor infiltration. To this end, the preform, optionally held in tooling, is placed in an infiltration enclosure into which a gas is admitted which, under predetermined temperature and pressure conditions, diffuses within the preform and forms a deposit on the fibers by one of the components of the gas decomposing or by a plurality of its components reacting together.

To obtain an interphase layer of boron nitride (BN) presenting little anisotropy, it is possible to use a gas made up in conventional manner by a mixture of boron trichloride $BCl_3$, ammonia $NH_3$, and hydrogen gas $H_2$. The temperature in the infiltration chamber lies in the range 650° C. to 900° C., and is preferably close to 700° C., and the pressure lies in the range 0.1 kPa to 3 kPa, and is preferably close to 1.3 kPa. Infiltration is continued until the thickness desired for the BN interphase has been reached, which thickness generally lies in the range 0.1 $\mu$m to 1 $\mu$m, and preferably in the range 0.1 $\mu$m to 0.25 $\mu$m.

To obtain an interphase layer of pyrolytic carbon (PyC) that presents little anisotropy, it is possible to use a gas that is constituted, for example, by methane, or by a mixture containing methane and an inert gas such as nitrogen. The temperature in the infiltration enclosure lies in the range 900° C. to 1000° C., and is preferably close to 1000° C., and the pressure lies in the range 0.1 kPa to 3 kPa, and is preferably close to 1.5 kPa. Infiltration is continued until the thickness desired for the PyC interphase has been reached, which thickness generally lies in the range 0.1 $\mu$m to 1 $\mu$m, and preferably in the range 0.1 $\mu$m to 0.25 $\mu$m.

The chemical vapor infiltration can be performed continuously or in pulses. In the first case, the reaction gas is admitted to one end of the enclosure and the residual gases are extracted from the opposite end in continuous manner, with the enclosure being maintained at the desired pressure.

In pulsed mode, the component layers of the interphase are made during consecutive cycles. Each cycle comprises a first portion during which the reaction gas is admitted into the enclosure and is maintained therein until an individual layer has been obtained, and a second portion during which the residual gases are exhausted from the enclosure by pumping or by sweeping with an inert gas. The duration of the first portion of the cycle is selected as a function of the thickness desired for an individual layer; this duration may be restricted to a few seconds or a few tens of seconds in order to produce individual layers having a thickness of nanometer order, i.e. less than 10 nanometers. The duration of the second portion of the cycle does not normally exceed one or several seconds.

Making the interphase by nanometer sequencing, i.e. by making a sequence of individual layers each having thickness of nanometer order, presents the advantage of leading to an interphase of microtexture and thickness that are well defined. During each cycle, the established operating conditions and in particular the restricted residence time serve to control accurately the microtexture and the thickness of the individual layer as deposited. This avoids possible variation in the microtexture of the kind that can be observed when the interphase is made in a single chemical vapor infiltration operation.

It will also be observed that the total time required for forming the interphase remains relatively short, even when several tens of cycles are necessary, since the cycles are of short duration and can follow one another without interruption.

The making of an interphase by nanometer sequencing is known in principle from document WO-A-95/09136, but in the context of making a lamellar interphase, in which the individual nanometer layers that are formed are different. The making of a PyC interphase by nanometer sequencing is also described in document EP-A-0 630 926, but likewise in the context of making a lamellar interphase.

After the interphase has been formed, the preform is densified by the ceramic matrix in order to obtain the desired piece.

Densification is preferably performed by chemical vapor infiltration.

By way of example, the ceramic matrix is a carbide or nitride matrix capable of developing a strong bond with the interphase. Ceramic materials suitable for this purpose include in particular silicon carbide SiC, boron carbide $B_4C$, and a ternary silicon-boron-carbon Si—B—C system, all capable of conferring self-healing properties to the matrix.

The ceramic matrix may have a single ceramic phase or a plurality of different phases. An example of a sequenced ceramic matrix made up of a plurality of different phases is a matrix comprising phases of SiC alternating with phases of $B_4C$ or Si—B—C, as described in document WO-A-96/30317, but with or without excess free carbon in the $B_4C$ and/or the Si—B—C phases as provided in that document. With such a sequenced matrix, it is advantageous to make an interphase of boron nitride (BN) and a first matrix phase of SiC in contact with the interphase, thereby making it possible to develop a very strong interphase/matrix BN/SiC bond. Crack deflection and decohesion then occurs at the inter-matrix SiC/$B_4C$ or SiC/Si—B—C bonds, which bonds are weaker than the bonds at the interphase between SiC fibers and BN interphase or between BN interphase and SiC phase. It will be observed that this remains true even when the first phase of the matrix in contact with the BN interphase is an SiC phase or some other ceramic phase, e.g. $B_4C$.

EXAMPLE 1

Two-dimensional woven plies made essentially of SiC fibers produced by Nippon Carbon under the name "Hi-Nicalon" were stacked to obtain a preform having a thickness of 2.5 mm. The preform was pretreated by immersion in a bath of acid as described in document U.S. Pat. No. 5,071,679. A boron nitride BN interphase was formed by chemical vapor infiltration using a gas comprising a mixture of boron chloride $BCl_3$, ammonia $NH_3$, and hydrogen gas $H_2$. Infiltration was performed continuously at a temperature of 700° C. under a pressure of 1.3 kPa, leading to a quasi-isotropic BN interphase. The thickness of the interphase was about 0.15 μm on average. Finally, the preform with the interphase was densified by a matrix of silicon carbide SiC by chemical vapor infiltration from a gas containing methyltrichlorosilane ($CH_3SiCl_3$) and hydrogen gas ($H_2$), at a temperature lying in the range 1000° C. to 1030° C., and under a pressure lying in the range 7 kPa to 12 kPa, for example using the method described in document WO-A-95/16803. A test piece was machined from the resulting SiC/BN/SiC composite material and was subjected to tensile testing at ambient temperature and in air. Curve B in FIG. 1 shows the relationship between the stress applied and the elongation measured. Breakage took place at a stress of 290 MPa with relative elongation of 0.33%.

Examination using a scanning electron microscope showed that the fibers of the preform presented no traces of attack by the precursor gases used for forming the BN interphase. No trace of cracking or decohesion was observed in the BN interphase or at the BN/fiber interphase or at the BN/matrix interphase, however intramatrix cracks were visible showing that zones existed within the matrix that presented lower shear strength. Transmission electron microscope (TEM) examination showed that the BN of the interphase was constituted by small non-oriented anisotropic domains included in a relatively isotropic phase, thereby giving it a microstructure presenting little anisotropy, overall.

Another test piece of the resulting SiC/BN/SiC composite material was subjected to tensile fatigue testing in air at 600° C., which testing consisted in applying a stress varying between 0 an 200 MPa at a frequency of 20 Hz. The observed lifetime was 44 hours (h).

Comparative Test No. 1

An SiC matrix composite material was made as described in Example 1, however the "Hi-Nicalon" fibers were replaced by fibers of the "Nicalon NL 200" type also produced by Nippon Carbon, and a BN interphase was formed of microstructure that presented little anisotropy. "Nicalon NL 200" fibers differ from "Hi-Nicalon" fibers particularly in having a rather high residual oxygen content (about 13% atomic) and a smaller modulus (about 220 GPa). The BN interphase was made by chemical vapor infiltration from a single gas mixture and under the same operating conditions. Infiltration was continued until an interphase was obtained having a mean thickness equal to about 0.15 μm.

After densification with the SiC matrix, tensile testing was performed at ambient temperature on a test piece of the resulting SiC/BN/SiC material. Curve A in FIG. 1 shows the relationship between the stress exerted and the relative elongation. Breakage took place at a stress of 180 MPa and relative elongation of 0.25%.

Another test piece was subjected to fatigue testing under tension in air at 600° C. Stress was varied from 0 to only 120 MPa at a frequency of 20 Hz, and the test piece was observed to break after 10 h.

The SiC/BN/SiC material of Example 1 not only provided greater protection for the interphase and the reinforcing fibers against oxygen of the surrounding medium, but also had a breaking stress that was considerably higher, compared with the prior art material.

EXAMPLE 2

The procedure was as in Example 1, however the SiC matrix was replaced by a self-healing matrix similar to that described in document WO-A-96/30317, i.e. comprising the following sequence:

(A) a first phase of SiC in contact with the BN interphase;

(B) a phase of boron carbide containing excess non-bonded carbon ($B_4C+C$);

(C) an SiC phase;

(D) a $B_4C+C$ phase;

(E) an SiC phase;

(F) a phase comprising an Si—B—C ternary system containing excess carbon not bonded to Si or B (Si—B—C+C);

(G) an SiC phase;

(H) an Si—B—C+C phase; and (I) an SiC phase.

The percentages by weight of the free carbon in phases (B), (D), (F), and (H) was equal respectively to 26%, 20%, 15%, and 8%.

The SiC phases were made by chemical vapor infiltration as in Example 1.

The $B_4C+C$ phases were made by chemical vapor infiltration using a gas comprising $BCl_3$, a hydrocarbon as a precursor for C such as methane ($CH_4$), and $H_2$, at a temperature lying in the range 800° C. to 1150° C., and at a pressure lying in the range 0.1 kPa to 50 kPa. The percentage by weight of excess free carbon in the resulting $B_4C+C$ phase was controlled by selecting the portions of the precursors $BCl_3$, $CH_4$, and $H_2$.

The Si—B—C+C phases were made by chemical vapor infiltration from a gas comprising $CH_3SiCl_3$, $BCl_3$, and $H_2$ at a temperature lying in the range 800° C. to 1150° C. and at a pressure lying in the range 0.1 kPa to 50 kPa. The percentage by weight of excess free carbon in the resulting Si—B—C+C phase was controlled by selecting the proportions of the precursors $CH_3SiCl_3$, $BCl_3$, $CH_4$, and $H_2$.

A test piece of the resulting composite material was subjected to tensile testing at ambient temperature. Curve C in FIG. 1 shows the relationship between the stress exerted and the relative elongation measured. Breaking took place at a stress of 332 MPa with relative elongation of 0.62%.

Examination under a scanning electron microscope showed no cracks or decohesion in the BN interphase.

Two other test pieces of the resulting material were subjected to tensile fatigue testing in air respectively at 600° C. and at 1200° C., each test consisting in applying stress varying form 0 to 200 MPa at a frequency of 20 Hz. At 600° C. lifetime was greater than 100 hours, and at 1200° C. it was about 30 hours.

These results are to be compared with those described above as obtained with a test piece of the material of Comparative Example No. 1.

What is claimed is:

1. A ceramic matrix composite material comprising fiber reinforcement of fibers essentially constituted by silicon carbide, and an interphase layer between the fibers of the reinforcement and the matrix, the material being characterized in that the fibers of the reinforcement are long fibers containing less than 5% atomic residual oxygen and having a modulus greater than 250 GPa, and the interphase layer is made of a material whose microstructure presents little anisotropy and is obtained by chemical vapor infiltration, the interphase layer being strongly bonded to the fibers and to the matrix in such a manner that the shear breaking strengths within the interphase layer and at the fiber-interphase bonds and at the interphase-matrix bonds are greater than the shear breaking strengths encountered within the matrix.

2. A composite material according to claim 1, characterized in that the fibers of the reinforcement contain less than 1% atomic residual oxygen.

3. A composite material according to claim 1, characterized in that the interphase is constituted by boron nitride that presents little anisotropy.

4. A composite material according to claim 1, characterized in that the interphase is constituted by pyrolytic carbon that presents little anisotropy.

5. A composite material according to claim 1, characterized in that the matrix comprises at least one phase of silicon carbide.

6. A composite material according to claim 1, characterized in that the matrix is a sequenced matrix comprising a plurality of ceramic phases, the shear breaking strength between the phases of the matrix being less than the shear breaking strengths between the fibers and the interphase and between the interphase and the matrix.

7. A composite material according to claim 6, characterized in that the matrix comprises a plurality of phases selected from silicon carbide, boron carbide, and a ternary silicon-boron-carbon system.

8. A composite material according to claim 1, characterized in that the matrix is a sequenced matrix comprising a plurality of ceramic phases, the interphase layer is of boron nitride, and the first phase of the matrix in contact with the interphase is of silicon carbide.

9. A method of manufacturing a ceramic matrix composite material piece, the method comprising preparing a fiber preform out of fibers constituted essentially by silicon carbide, forming an interphase layer on the fibers, and densifying the preform with its interphase layer by the ceramic matrix, the method being characterized in that the preform is made from fibers containing less than 5% atomic oxygen and having a modulus greater than 250 GPa, and the interphase layer formed on the fibers presents little anisotropy and is made by chemical vapor infiltration prior to densification by the ceramic matrix, said interphase layer being strongly bonded to the fibers and to the matrix in such a manner that the shear breaking strengths within the interphase layer and at the fiber-interphase bonds and at the interphase-matrix bonds are greater than the shear breaking strengths encountered within the matrix.

10. A method according to claim 9, characterized in that the preform is made from fibers containing less than 1% atomic oxygen.

11. A method according to claim 9, characterized in that an interphase layer of boron nitride is formed on the fibers.

12. A method according to claim 9, characterized in that an interphase layer of pyrolytic carbon is formed on the fibers.

13. A method according to claim 9, characterized in that the interphase layer is formed by nanometer sequencing.

14. A method according to claim 9, characterized in that, prior to forming the interphase layer, the fibers of the preform are subjected to heat treatment at a temperature greater than 1250° C. under an inert atmosphere.

15. A method according to claim 14, characterized in that the heat treatment is performed under an argon atmosphere.

16. A method according to claim 9, characterized in that, prior to forming the interphase layer, chemical treatment is applied to the surface of the fibers by immersion in a bath of acid.

17. A method according to claim 9, characterized in that the preform provided with the interphase layer is densified by chemical vapor infiltration.

18. A composite material according to claim 2, characterized in that:
    the interphase is constituted by boron nitride or pyrolytic carbon that presents little anisotropy;
    the matrix comprises at least one phase of silicon carbide;
    the matrix is a sequenced matrix comprising a plurality of ceramic phases, the shear breaking strength between the phases of the matrix being less than the shear breaking strengths between the fibers and the interphase and between the interphase and the matrix;
    the matrix comprises a plurality of phases selected from silicon carbide, boron carbide, and a ternary silicon-boron-carbon system.

19. A composite material according to claim 2, characterized in that the matrix is a sequenced matrix comprising a plurality of ceramic phases, the interphase layer is of boron nitride, and the first phase of the matrix in contact with the interphase is of silicon carbide.

20. A method according to claim 10, characterized in that:
    an interphase layer of boron nitride or pyrolytic carbon is formed on the fibers;
    the interphase layer is formed by nanometer sequencing;
    prior to forming the interphase layer, the fibers of the preform are subjected to heat treatment under an argon atmosphere at a temperature greater than 1250° C. under an inert atmosphere;
    prior to forming the interphase layer, chemical treatment is applied to the surface of the fibers by immersion in a bath of acid;
    that the preform provided with the interphase layer is densified by chemical vapor infiltration.

* * * * *